(12) United States Patent
Laurila et al.

(10) Patent No.: US 8,693,382 B2
(45) Date of Patent: *Apr. 8, 2014

(54) GROUP COMMUNICATION FOR A VARIETY OF MEDIA TYPES AND DEVICES

(75) Inventors: Antti Laurila, Helsinki (FI); Miikka Poikselkä, Espoo (FI)

(73) Assignee: Core Wireless Licensing S.A.R.L., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,051

(22) Filed: Jun. 5, 2012

(65) Prior Publication Data

US 2012/0259934 A1 Oct. 11, 2012

Related U.S. Application Data

(63) Continuation of application No. 11/362,941, filed on Feb. 28, 2006, now Pat. No. 8,213,346.

(30) Foreign Application Priority Data

Dec. 2, 2005 (FI) .................................. 20055644

(51) Int. Cl.
*H04H 20/71* (2008.01)
*H04B 7/00* (2006.01)

(52) U.S. Cl.
USPC ............................. 370/312; 709/203; 455/518

(58) Field of Classification Search
USPC ................. 370/259–263, 312, 351, 389, 390; 455/516–519; 709/204, 225
See application file for complete search history.

(56) References Cited

U.S. PATENT DOCUMENTS

| 6,477,150 | B1 * | 11/2002 | Maggenti et al. | 370/312 |
| 6,496,849 | B1 * | 12/2002 | Hanson et al. | 709/200 |
| 7,593,359 | B2 | 9/2009 | Eneroth et al. | |
| 2002/0105917 | A1 | 8/2002 | Rabipour et al. | |
| 2002/0142749 | A1 | 10/2002 | Muniere et al. | |

(Continued)

FOREIGN PATENT DOCUMENTS

| WO | 2005/020598 A2 | 3/2005 |
| WO | 2005/039132 A1 | 4/2005 |

(Continued)

OTHER PUBLICATIONS

European Search Report application no. 06820110.2 dated Nov. 27, 2012.

(Continued)

*Primary Examiner* — Paul H Masur
(74) *Attorney, Agent, or Firm* — Winstead PC

(57) ABSTRACT

An apparatus includes at least one memory including computer program code and at least one processor. The at least one memory and the computer program code are configured to, with the at least one processor, cause the apparatus at least to receive a message containing no media content, the message indicating one or more supported media types by a group, cross-check the indicated supported media types with usable media types in the group, based on the cross-check, determine whether at least one of the indicated supported media types is found in the usable media types in the group and, based on the determination, send the message without modifying the indicated supported media types if all of the indicated supported media types are determined to be usable media types.

20 Claims, 5 Drawing Sheets

(56) References Cited

U.S. PATENT DOCUMENTS

| | | |
|---|---|---|
| 2003/0014488 A1 | 1/2003 | Dalal et al. |
| 2003/0158901 A1 | 8/2003 | Ludwig et al. |
| 2004/0199580 A1 | 10/2004 | Zhakov et al. |
| 2005/0124365 A1 | 6/2005 | Balasuriya et al. |
| 2005/0267936 A1 | 12/2005 | Poikselka |
| 2006/0067287 A1 | 3/2006 | Kim et al. |
| 2006/0089998 A1 | 4/2006 | Kim et al. |
| 2006/0161621 A1* | 7/2006 | Rosenberg .................. 709/204 |
| 2006/0233171 A1* | 10/2006 | Murray et al. ............... 370/390 |
| 2006/0234744 A1 | 10/2006 | Sung et al. |
| 2007/0133435 A1 | 6/2007 | Eneroth et al. |

FOREIGN PATENT DOCUMENTS

| | | |
|---|---|---|
| WO | 2005/039145 A1 | 4/2005 |
| WO | 2005/043944 A1 | 5/2005 |
| WO | 2006/0006897 | 1/2006 |

OTHER PUBLICATIONS

Notification of 3rd Office Action; dated Nov. 3, 2011, Issued from the State Intellectual Property Office of the People's Republic of China for corresponding Chinese Application No. 200680051090.0.

Japanese Office Action, Notice of Reasons for Rejection application No. 2008-542788 dated Jan. 13, 2011.

* cited by examiner

GROUP COMMUNICATION FOR A VARIETY OF MEDIA TYPES AND DEVICES

CROSS REFERENCE TO RELATED APPLICATION

This application is a continuation of U.S. patent application Ser. No. 11/362,941, filed on Feb. 28, 2006, which is based upon and claims the benefit of priority from Finland Patent Applications No. 2005-5644 filed on Dec. 2, 2005, of which the contents are incorporated herein by reference.

FIELD OF THE INVENTION

The present invention relates to group communication in communication systems providing a group communication service.

BACKGROUND OF THE INVENTION

One special feature offered in mobile communication systems is group communication. The term "group", as used herein, refers to any logical group of two or more users intended to participate in the same group communication. One example of group communication is a group call, which is a call in which all participants may take turns to speak and to listen to each other.

Conventionally, group communication has been available only in trunked mobile communication systems, such as Professional Mobile Radio or Private Mobile Radio (PMR) systems, such as TETRA (Terrestrial Trunked Radio), which are special radio systems primarily intended for professional and governmental users. Thanks to the evolvement of communication technology, particularly IP-based communication technology, and end user equipment, a group communication service is now also available in public mobile communication systems. Examples of services providing group communication service include Push-to-talk over Cellular (PoC), messaging (IM), and conferencing, all implemented using primitives provided by SIP (Session Initiation Protocol), which is not vertically integrated into a communication system but a tool to build a multimedia architecture. Such group communication may include data calls, audio calls, video calls, multimedia calls, messaging, electronic mail, etc.

Due to the versatile communication possibilities, different media types can be usable in a group, such as a Voice PoC call, SIMPLE (SIP for Instant Messaging and Presence Leveraging Extensions) IM chat, Video PoC call and Gaming Service. Typically only some of the above media types are defined as supported media type(s) by the group when the group definitions are created. Group members may be informed about the supported media type(s) in a message advertising the group or in a message inviting group members to join the group, for example (A group member is a user intended to participate in the group communication.) However, the supported media type(s) in the above messages may contain a media type or media types which are not defined as supported ones. Thus, group members may receive confusing or erroneous information.

BRIEF DESCRIPTION OF THE INVENTION

An object of the present invention is thus to provide a method and an apparatus for implementing the method so as to overcome the above problem. The object of the invention is achieved by a method, user equipment, servers, a system and a computer program product, which are characterized by what is stated in the independent claims Preferred embodiments of the invention are disclosed in the dependent claims.

The invention is based on realizing the problem and solving it by cross-checking indicated supported media type(s) in a message with usable media type(s) and, if they match, by sending the message or showing the information to the user.

The present invention provides an easy-to-implement solution for ensuring that group members do not receive confusing information about supported media types in the group.

BRIEF DESCRIPTION OF THE DRAWINGS

In the following, the invention will be described in greater detail by means of preferred embodiments and with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is made to the same embodiment(s), or that the feature only applies to a single embodiment. In addition, the embodiments presented below or parts thereof can be combined to produce preferred embodiments of the invention.

The present invention is applicable to any user equipment, servers and/or to any communication system or any combination of different communication systems that support group communication and provide(s) messages with which supported media type(s) by a group are indicated to group members. No limitations exist to the message format, nor to the group type. The communication system may be a fixed communication system or a wireless communication system or a communication system utilizing both fixed networks and wireless networks. The protocols used, the specifications of communication systems and user equipment, especially in wireless communication, develop rapidly. Such development may require extra changes to the invention. Therefore, all words and expressions should be interpreted broadly and they are intended to illustrate, not to restrict, the invention.

In the following, the present invention will be described using, as an example of a system architecture whereto the present invention may be applied, an architecture based on SIP providing a tool to build a multimedia architecture and utilizing XDM (XML Document Management) without restricting the invention to such an architecture, however. SIP is an application-layer control (signaling) protocol defined by the Internet Engineering Task Force (IETF) for creating, modifying, and terminating sessions with one or more participants. Open Mobile Alliance (OMA) has defined XDM as a generic framework for group and list management based on an XCAP protocol (XML Configuration Access Protocol). IETF specifications and Internet Drafts can be found at www.ietforg, and OMA specifications at www.openmobilealliance.org.

Figure 1:
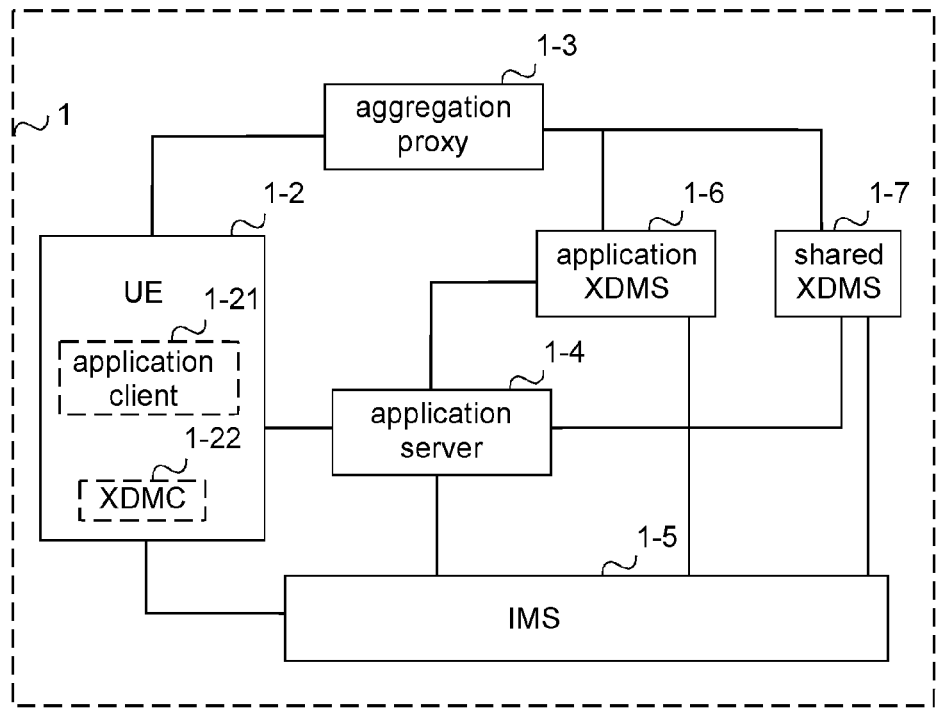
FIG. 1 illustrates an example of a general architecture of a communication system providing a group communication service.

A general architecture of a communication system providing a group communication service utilizing SIP and XCAP is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, including invitations to join the group communication or for advertising a group, are irrelevant to the actual invention. Therefore, they need not be discussed in more detail here.

The communication system 1 comprises user equipment (UE) 1-2, such as a mobile station, which is connectable to an aggregation proxy 1-3, application server 1-4 and to an IP Multimedia Subsystem (IMS) 1-5, and via them to an application XML Document Management Server (XDMS) 1-6 and a shared XDMS 1-7. As functional entities, UE 1-2 contains an application client 1-21 with which the service provided by the application is accessed, and an XML Document Management Client (XDMC) 1-22 with which XML documents, or an element/elements within an XML document, may be created, deleted, modified and retrieved, for example. Typically, control plane traffic, such as SIP signaling, passes through IMS 1-5 but user plane traffic passes between UE 1-2 and the application server 1-4. Group and list management traffic using the XCAP protocol goes between the UE (or, more precisely, XDMC 1-22 in the UE) and the application XDMS 1-6 or the shared XDMS 1-7 via the aggregation proxy 1-3.

The aggregation proxy 1-3, application XDMS 1-6 and shared XDMS 1-7 are XDM functional entities. XDM defines a common mechanism that makes user-specific service-related information, such as group definitions, accessible to different applications (service enablers) and clients residing in user equipment, and enables creation, modification, retrieval and deletion of such information. The information, more precisely, XML documents, are stored in XDMSs. The application XDMS 1-6 is an application-specific server, i.e. it serves one or more application servers, each for the same particular application, whereas the shared XDMC 1-7 serves application servers for different applications in the system and contains generic group and list management data. The aggregation proxy 1-3 routes an individual XCAP request from the XDMC to the correct XDMS.

The application providing the group communication service may be PoC, messaging, or conferencing, for example. A PoC specification is currently being developed by a PoC working group under the OMA. More detailed information on the PoC can be found via the above-mentioned Internet pages of OMA. SIMPLE, defined by IETF, provides instant messaging (IM) service. OMA also defines an IM (Instant Messaging) enabler based on SIP/SIMPLE protocols. Thus, the application server 4 may be a PoC server, an instant messaging server, or a conference server that supports different media types, such as audio, video and messaging. Since the application XDMS 1-6 serves a single application, the application XDMS 1-6 may be a PoC XDMS or instant messaging XDMS. For example, when the application is PoC, contact lists may be stored in the shared XDMS 1-7 and/or in the PoC XDMS, i.e. application XDMS 1-6, which contains PoC group documents. A PoC group document providing a member list for a PoC group session is thus accessible to UE 1-2 and to a PoC server, i.e. the application server 1-4, and they can utilize the member list when advertising the group or when establishing a group session (inviting group members to a group session). The PoC group document according to the invention preferably also contains at least supported media types by the group in addition to member list. The PoC group document may also contain group member-specific information, such as allowed media type(s) of a group member in the group. The server according to an embodiment of the invention may comprise an application performing one or more of the functionalities described below with a server. Said application may be shipped with the server, or it may be a downloadable plug-in to the server, otherwise later added to the server, or an existing application in the server may be modified to comprise said functionalities. It is also possible that server(s) is (are) not modified to perform functionalities described below with a server.

UE 1-2, or more specifically the application client 1-21 or the XDMC 1-22, allows, among other things, application session initiations and provides access to different group lists and contact lists. The application client and/or the XDMC or the user equipment in which the clients reside may be configured to form and send messages advertising a group, add information on supported media types by a group to a message advertising the group, and to store the information on supported media types in the group. The application client 1-21 and/or the XDMC 1-22 according to an embodiment of the invention may be shipped with the user equipment, or it may be a downloadable plug-in to the user equipment, otherwise later added to the user equipment, or a client in the user equipment may be modified to be a client according to an embodiment of the invention. It is also possible that the user equipment does not comprise any client according to an embodiment of the invention, i.e. the user equipment is not modified to perform functionalities described below with user equipment.

A media type covers here a general type of data and/or communication means which are negotiable between endpoints, i.e. UEs. Examples of media types include top-level media types defined by IETF in RFC 2046, Multipurpose Internet Mail Extensions (MIME) Part two: Media Types, November 1996. The top-level media types include, but are not limited to, text (textual information), image (image data), audio (audio data), video (video data), application (some other kind of data, typically either uninterpreted binary data or information to be processed by an application), multipart (data consisting of multiple entities of independent data types) and message (an encapsulated message). In addition, media types contain different sub-types and/or connection types (including different overlay services) providing group communication services. Thus, media types may be selected from the group of 'poc', 'im', 'audio', 'video', 'conference', 'application', 'all', 'other', for example.

"Supported media types" means media types that are defined to be usable in the group. There may be one, two, three or more supported media types by a group; the amount is unlimited. The supported media types only indicate what media types can be used in the group but they do not necessitate using media components of all supported media types in group communication. For example, if supported media types by a group are audio, video and messaging, it is possible that only audio is used during a group communication session of the group.

In the following, the invention will be illustrated assuming, for the sake of clarity, that the message indicating supported media type(s) is a group advertisement without limiting the invention to such a message. Such a group advertisement is illustrated in U.S. patent application Ser. No. 11/285,107 of the same applicant, which US patent application is incorporated herein by reference. Another example of such a message is SIP INVITE. In the above-identified patent application, the term "usable media type(s) in a group" means the same as the term "supported media type(s) by a group" here.

Figure 2:
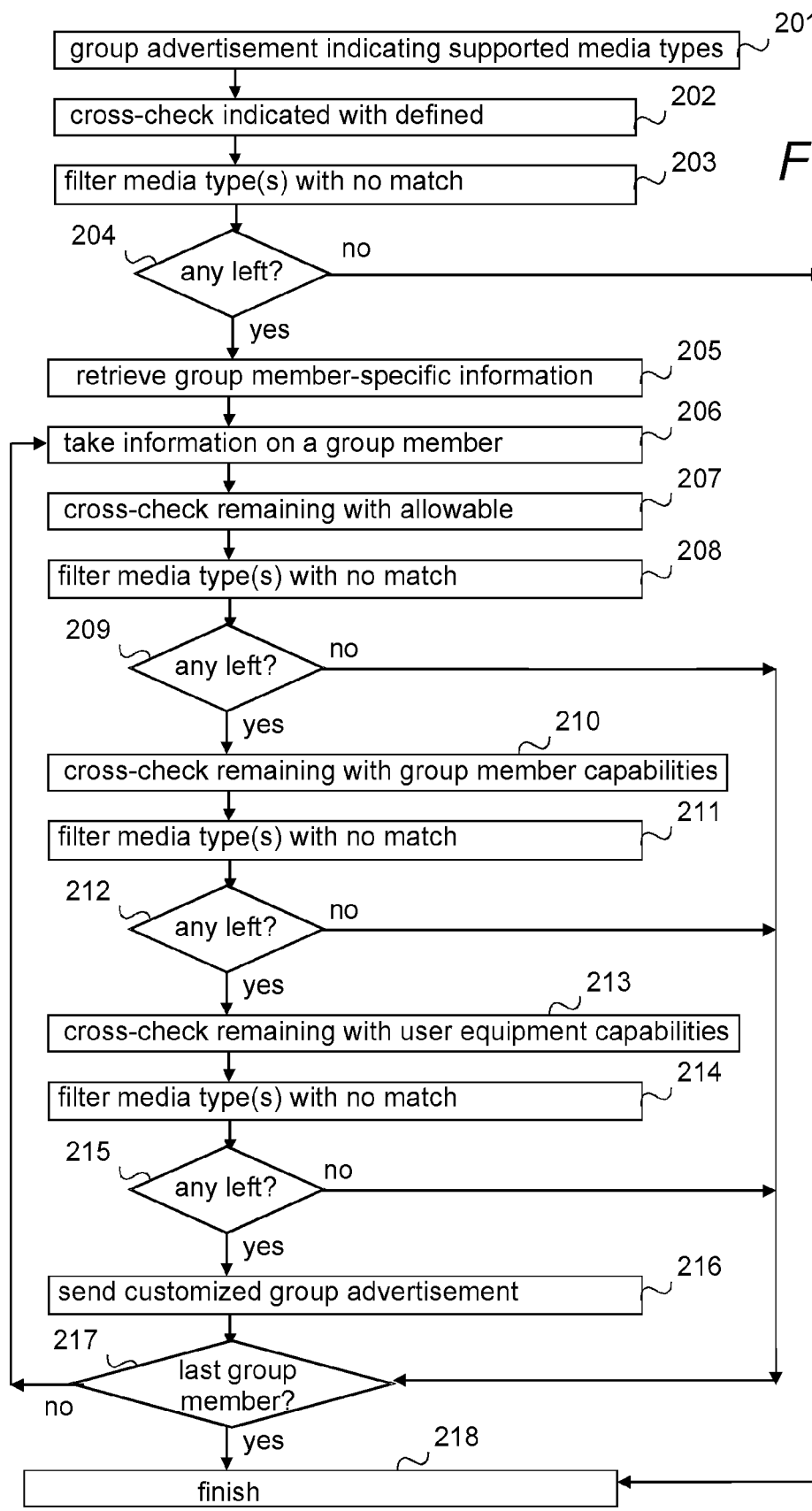
FIGS. 2, 3 and 4 are flowcharts illustrating functionality of a server according to embodiments of the invention.

FIG. 2 illustrates functionality of a server according to an embodiment of the invention. In the example of FIG. 2, it is assumed that the server receives a group advertisement to be delivered to group members. Further assumptions made with the example of FIG. 2 are that the server is able to retrieve, in addition to defined supported media type(s) by the group and at least for some group members allowable media type(s) of a group member, information on group member capabilities of at least some group members and information on user equipment capabilities of at least some group members. "Allowable media type of a group member" means media types that are defined as allowed to the group member for group communication in the group. Typically a group creator defines them. The allowed media type(s) of a group member may be a subset of the supported media type(s), and group members may have different allowed media type(s). There may be one, two, three or more allowable media types of a group member; the amount is limited to the supported media types. For example, if supported media types by a group are audio, video and messaging, it is possible that only messaging is allowed to a group member whereas audio, video and messaging are allowable to another group member. Group member capabilities, also called user capabilities, may be stored in the user profile or in subscriber information of the user, for example. User equipment may be a dispatcher station, for example, the capabilities of which may be stored in the network. Typically user equipment capabilities are not stored as part of user information in the network but maintained in the user equipment. However, it is irrelevant to the invention where the information is stored and whether or not all the information is stored.

In the example of FIG. 2, the server receives a group advertisement in step 201, the group advertisement containing indication on supported media types by the group the message is advertising. Then the server cross-checks, in step 202, the indicated supported media types with the defined supported media types by the group and filters, in step 203, those supported media types from the group advertisement that do not belong to defined supported media types by the group. In other words, those indicated supported media types having no match in the defined supported media types are filtered from the group advertisement. This cross-checking provides a further advantage that a media type not supported by the group is not indicated as a supported one; thus ensuring that group members do not receive confusing/erroneous information.

If there are still supported media types left (step 204), the server retrieves, in step 205, for each group member group member-specific information including allowable media type(s) of the group member in the group, group member capabilities, and user equipment capabilities. In the illustrated example it is assumed, for the sake of clarity, that each group member has said definitions. Then the server takes, in step 206, information on a group member, i.e. definitions of one group member, and cross-checks, in step 207, the remaining supported media type(s) with group member's allowable media types in the group and filters, in step 208, from the group advertisement those supported media types that are not allowable media types in the group for the group member in question. In other words, the supported media type(s) having no match in the group member's allowable media type(s) is(are) filtered from the group advertisement. This cross-checking provides a further advantage that it is possible to limit/allow usage of certain media types to certain users in a group and provide information on supported media types for each group member on the basis of the group definitions, both common and user-specific.

If there are still supported media types left (step 209), the server cross-checks, in step 210, the remaining supported media type(s) with group member capabilities, and filters, in step 211, those supported media types from the group advertisement that are not within the group member capabilities of the group member in question. This cross-checking provides a further advantage that the group member does not receive confusing information and that profile definitions, for example, can be taken into account, when a group is advertised or group members are invited to join the group.

If there are still supported media types left (step 212), the server cross-checks, in step 213, the remaining supported media type(s) with group member's user equipment capabilities, and filters, in step 214, those supported media types from the group advertisement that are not within the user equipment capabilities of the group member in question. This cross-checking provides a further advantage that an intended group member does not receive information on group he/she cannot join because of the user equipment currently in use.

If there is still at least one supported media type left (step 215), the server sends, in step 216, a customized group advertisement to the group member in question. If the group member was not the last in the group (step 217), the server returns to step 206 and takes information on another group member to be processed. If the group member was the last one, the server has accomplished the processing of this group advertisement and finishes the process, in step 218.

If, in the group member-specific part of the process (i.e. steps 206 to 217), the server notices that all supported media types are filtered (step 209, or step 212, or step 215), the server sends no advertisement to the group member in question but proceeds to step 217 to check whether or not the group member was the last in the group. This provides a further advantage that an intended group member does not receive information on group he/she cannot join.

If all supported media types are filtered from the group advertisement (step 204) in the group specific part of the process (i.e. steps 201 to 204), the server sends no group advertisement, but proceeds to step 218 to finish processing this group advertisement. This provides a further advantage that the network (and system) is not loaded with messages containing false information. Depending on the implementation, the server may send the originator of the group address an indication that it is impossible to advertise with the indicated supported media type(s). Depending on the implementation, the server may send the originator of the group address an indication that it is impossible to advertise with the indicated supported media type(s).

In situations in which only some of the group members have group member-specific information or some piece of the group member-specific information, the server may be configured to send the group advertisement filtered by step 203 to group members having no group member-specific information, and to perform cross-checking only with the piece of information obtained for those group members having only some piece of the group member-specific information described above. For example, if a group member has only allowable media types, the server may be configured to skip steps 210 to 215 and send customized group advertisement based on the filtering result of step 208. Another alternative may be that the server assumes that the group member-specific information is the same as the defined supported media type(s) if no other information is obtained.

In other embodiments of the invention, the server may be arranged to skip one or more of the above described cross-checkings with related steps, it suffices that one cross-checking is performed on the group advertisement or a corresponding message indicating supported media type(s) by the group. In other words, it suffices that indicated supported media type(s) by a group is(are) cross-checked with usable media type(s), the usable media types covering here one or more of the following media type(s) and/or media type(s) defined by them: defined supported media type(s) by the group; allowable media type(s) of a group member, group member capabilities of a group member and user equipment capabilities of user equipment used by a group member.

Figure 3:
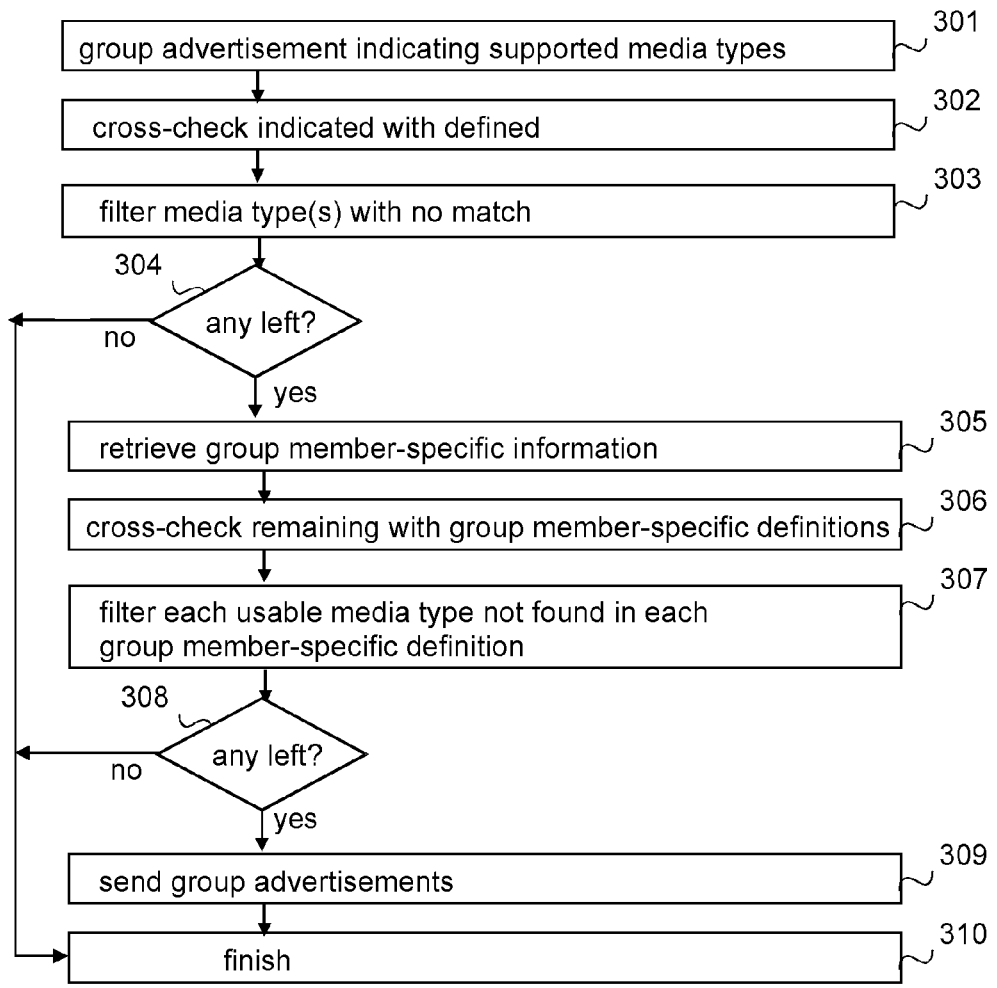

FIG. 3 illustrates functionality of a server according to another embodiment of the invention. In the example of FIG. 3, it is also assumed that the server receives a group advertisement to be delivered to group members and that the server is able to retrieve, in addition to supported media type(s) by the group, at least for some group members allowable media type(s) of a group member. The server may be further arranged to retrieve information on group member capabilities of at least some group members and/or information on user equipment capabilities of at least some group members.

The embodiment illustrated in FIG. 3 comprises a group specific part similar to the one in the above example, i.e. steps 301-304 corresponds to steps 201-204, respectively, and therefore needs not be discussed in detail here. However, instead of forming a customized group advertisement, the server of this embodiment sends a group advertisement with the same indication of supported media type(s).

Assuming that the received group advertisement contained indications of supported media type(s) defined for the group (step 304; yes), the server retrieves, in step 305, for each group member group member-specific information including allowable media type(s) of the group member in the group, group member capabilities, and/or user equipment capabilities. Allowable media type(s) for one group member is one group member-specific definition, as well as group member capabilities of one group member and the group member's user equipment capabilities. After retrieving the group member-specific definitions (step 305), the server cross-checks, in step 306, remaining supported media type(s) with each group member definition, and filters, in step 307, each supported media type which is not found in each group member definition. If there are any supported media type(s) left (step 308), the server then sends, in step 309, the group advertisement to all group members. Thus, the server has accomplished the processing of this group advertisement and finishes the process, in step 310.

If the server notices in step 304 or 308 that all supported media types are filtered, the server sends no advertisement to the group member in question but proceeds to step 310 to finish the process.

In yet another embodiment of the invention, a server may be configured to employ with certain types of groups a procedure according to an embodiment disclosed with FIG. 2, and to other types of groups a procedure according to an embodiment disclosed with FIG. 3.

Figure 4:
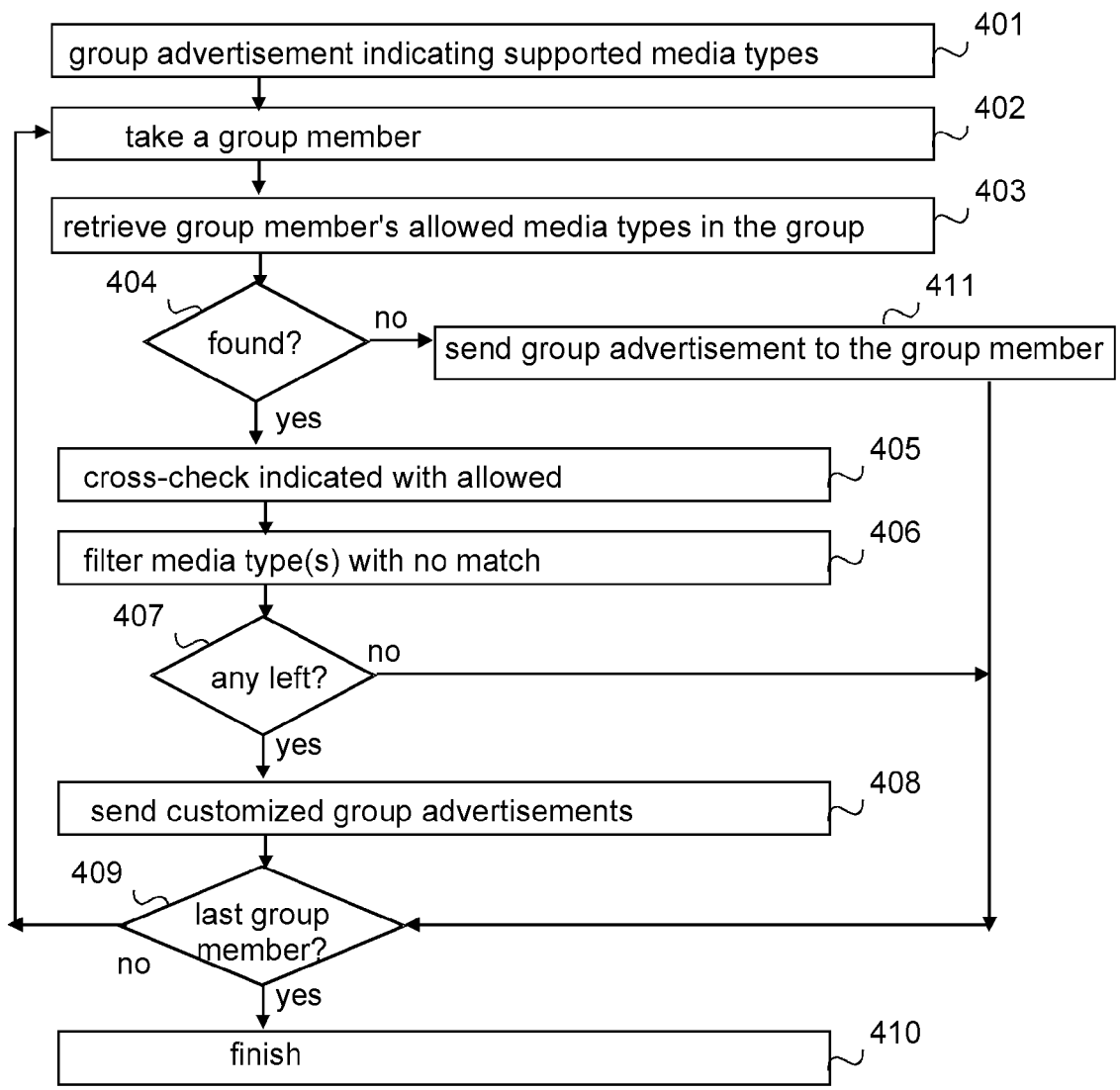

FIG. 4 illustrates situation in which the server is configured to send messages advertising a group without receiving an advertisement from a group creator, the messages being sent to all group members or to a selected subset of the group members. Such an application server is illustrated in U.S. patent application Ser. No. 10/880,982 of the same applicant, which US patent application is incorporated herein by reference. (A corresponding PCT application is PCT/FI2005/050137). In the example illustrated in FIG. 4, it is assumed that the server has added indications on supported media types by a group based on the defined supported media types by the group to a group advertisement, i.e. there is no need to check whether or not all indicated supported media type(s) can be found in the defined supported media types, since they are preferably the same.

The example illustrated in FIG. 4 starts when a group advertisement indicating supported media types by a group is created in step 401. After that the server takes, in step 402, a group member from the group member list and retrieves, in step 403, the group member's allowable media type(s) in the group. If allowable media type(s) in the group is(are) defined for the group member (step 404), the server cross-checks, in step 405, the indicated supported media type(s) with the group member's allowable media types in the group and filters, in step 406, those supported media types from the group advertisement that are not allowable media types in the group for the group member in question. In other words, the supported media type(s) having no match in the group member's allowable media type(s) is(are) filtered from the group advertisement. If there are still supported media types left (step 407), the server sends, in step 408, a customized group advertisement to the group member in question. If the group member was not the last in the group (step 409), the server returns to step 402 and takes another group member to be processed. If the group member was the last one, the server has accomplished the processing of this group advertisement and finishes the process, in step 410.

If the server notices that all supported media types are filtered (step 407), the server sends no advertisement to the group member in question but proceeds to step 409 to check whether or not the group member was the last in the group.

If the server notices that there are no definitions for allowable media type(s) in the group for the group member in question (step 404), the server according to the illustrated example sends, in step 411, the created group advertisement to the group member and proceeds to step 409 to check whether or not the group member was the last in the group. In another embodiment of the invention, the server may be configured not to send a group advertisement to such a group member, i.e., the server omits step 411, and proceeds directly to step 409.

In other embodiments, the process illustrated in FIG. 4 may be enhanced to comprise one or more cross-checkings illustrated with FIG. 2 and/or to replace the cross-checking relating to allowable media type(s) with another cross-checking illustrated with FIG. 2.

In some other embodiments of the invention, when the indicated supported media type(s) are cross-checked with the ones that are defined as supported media type(s), the server may be arranged to add to the message those media type(s) which belongs (belong) to the defined supported media type(s) but are not included in the message, even to add the defined supported media type(s) to a message advertising a group or inviting group members to join a group which does not indicate any supported media types defined supported media types. In other words, instead of filtering media type(s) from the message, or in addition to filtering, defined supported media type(s) having no match in the indicated media type(s) is(are) added to the message. For example, in step 203 of FIG. 2 or in step 303 of FIG. 3, the server may add those defined supported media type(s) that is(are) not indicated, and in step 207, the remaining supported media type(s) comprises (comprise) the added media type(s) in addition to the remaining indicated supported media type(s). A further advantage of adding the missing ones to a message is to ensure that all possible supported media types are indicated and none is left out by mistake.

Although in the above it is assumed that a server performs the cross-checkings with related steps, the cross-checkings may be performed by two or more servers being preferably configured to perform dedicated cross-checkings so that the same cross-checking is not performed twice.

Figure 5:
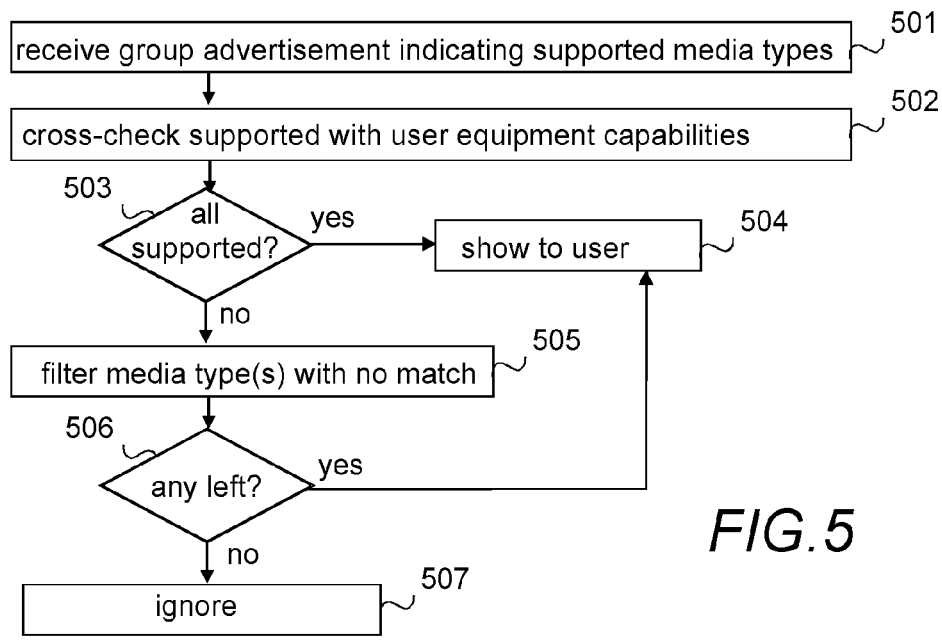
FIG. 5 is a flowchart illustrating functionality of user equipment according to an embodiment of the invention.

FIG. 5 illustrates functionality of user equipment according to an embodiment of the present invention. The example illustrated in FIG. 5 starts when the user equipment receives, in step 501, a group advertisement, or a corresponding message indicating supported media type(s) in a group. In response to the reception of the message, the user equipment cross-checks, in step 502, the indicated supported media types with the user equipment capabilities, i.e. with its own capabilities. If the user equipment supports all indicated supported media types (step 503), the group advertisement with the indicated supported media types is shown, in step 504, to a user of the user equipment.

If the user equipment does not support all the indicated supported media types (step 503), the user equipment filters, in step 505, the unsupported media types from the group advertisement. In other words, those supported media types having no match within the user equipment capabilities are filtered from the group advertisement.

If there are supported media types left (step 506), the group advertisement with the remaining supported media types is shown, in step 504, to the user. If the user equipment does not support any indicated supported media types, i.e. all are filtered (step 506), the user equipment ignores, in step 507, the group advertisement. In other words, the user equipment does not show it to the user. In another embodiment of the invention, the user equipment may, in step 507, instead of ignoring, show the group advertisement to the user and inform the user that he/she cannot join to the group with this user equipment.

In another embodiment of the invention, the user equipment may, in step 505, instead of filtering the media type(s) with no match from the group advertisement, indicate the media type(s) as supported by the group but not usable to the user with this user equipment. In this embodiment, in addition to the group advertisement with the remaining, i.e. usable, media type(s), also the media type(s) not supported by the user equipment is(are) shown to the user with information that he/she cannot use the media type(s) with this user equipment.

In another embodiment of the invention, the user equipment is arranged to ignore the message if there is at least one indicated supported media type that is not supported by the user equipment.

Although in the above it is assumed that the user equipment receives the group advertisement, it is obvious to one skilled in the art that the user equipment may perform the above described steps, or some of them, in response to creating and/or sending a group advertisement, or corresponding message indicating the supported media type in a group, to be forwarded to group member(s).

Figure 6:
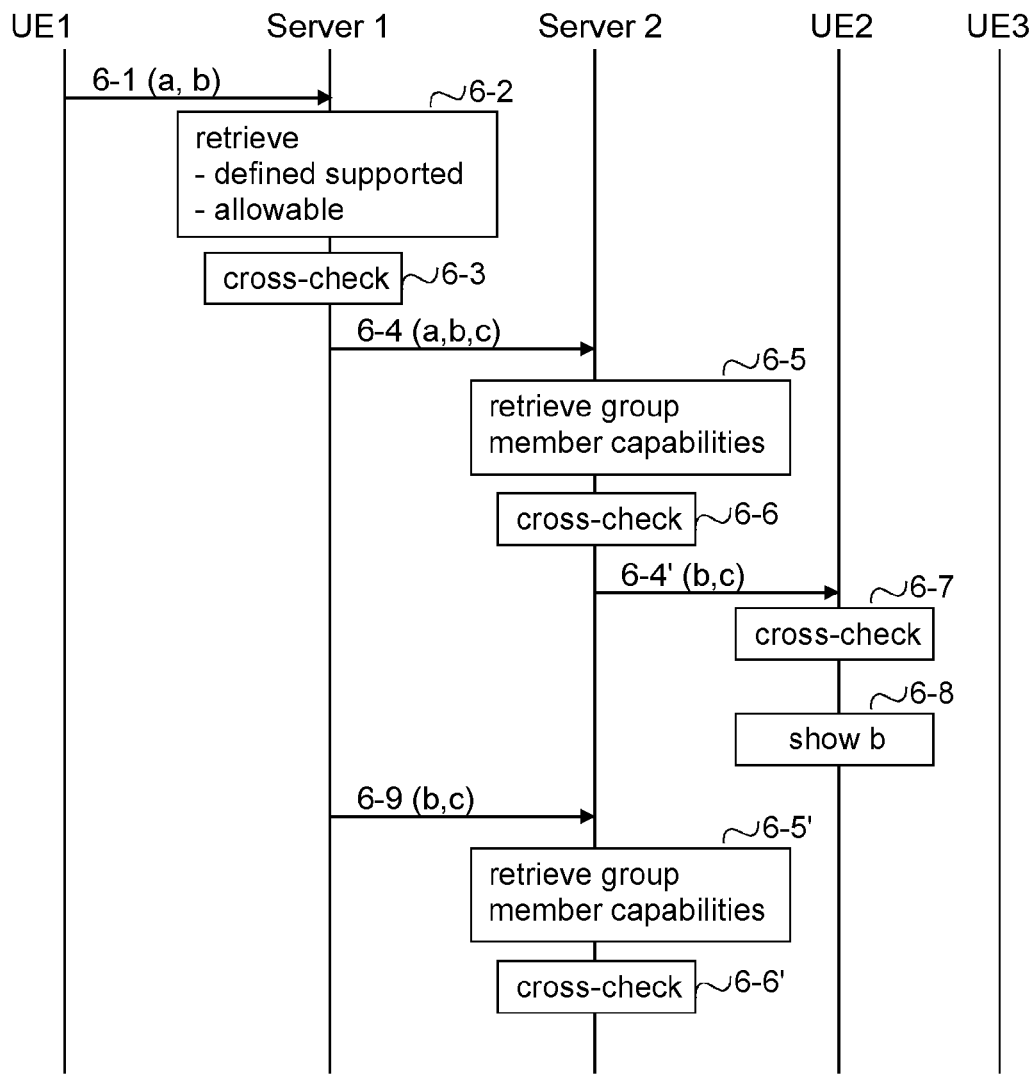
FIG. 6 illustrates an example of signaling according to an embodiment of the invention.

FIG. 6 illustrates signaling according to an embodiment of the invention. The example shown in FIG. 6 is for a group having three group members illustrated by UE1, UE2 and UE3, the members being subscribers of two different operators. In the example, it is assumed that UE1 is a subscriber of an operator having an application server (server 1), whereas UE2 and UE3 are subscribers of another operator having another application server (server 2). It is further assumed that the server 1 has access to defined supported media type(s) by the group and allowable media type(s) of group member(s), and group member (i.e. user) capabilities of UE1, and server 2 has access to group member capabilities of UE2 and UE3. A further assumption is that user equipment capabilities are maintained by UE1, UE2 and UE3.

In the example, the user of UE1 wants to advertise the group or to invite group members to join the group, and therefore sends message 6-1 to server 1, message 6-1 indicating a and b as supported media types by the group. In this example, it is assumed that the server 1 is configured to multiply message 6-1 only to other members of the group, i.e. not send it back (with possible updated supported media types) to UE1. In response to receiving message 6-1, the server 1 retrieves, in point 6-2, group definitions of the group in question, the group definitions containing the defined supported media type(s) by the group and possible group member-specific information on the other group members, such as allowable media type(s) for each group member, if any, and group member capabilities of those group members that are served by the server 1. In this example, defined supported media types are a, b, and c; there are no specific definitions for allowable media type(s) for UE2 thus indicating that all defined supported media types are allowed to it, but UE3 has b and c as allowable supported media types. Since only the originator of message 6-1 was served by the server 1, no group member capability information was retrieved. However, in some other embodiments of the invention, the server 1 may retrieve group member capabilities of UE1.

Then the server 1 cross-checks, in point 6-3, the indicated supported media type(s) with the defined supported media type(s), and in this example adds c to be one of the indicated supported media type(s), and then cross-checks group member-specifically the media types that are in the message as outcome of the first cross-checking Since in the example of FIG. 6 all defined supported media types (a, b, and c) are allowed to UE2, the server 1 sends message 6-4 to the server 2 serving UE2 to be delivered to UE2, message 6-4 indicating a, b, and c as supported media types. Since in the example of FIG. 6, media types b, and c are allowed to UE3, the server 1 sends message 6-9 to the server 2 serving UE3 to be delivered to UE3, message 6-9 indicating b and c as supported media types When the server 2 receives message 6-4, it retrieves, in point 6-5, group member capabilities of UE2, which in this example are b and c. The server 2 then cross-checks, in step 6-6, the indicated supported media types, a, b, and c, with the group member capabilities b and c. In this example, the server 2 filters a (having no match) from the message and sends message 6-4' to the UE2, message 6-4' indicating b and c as supported media types.

In response to message 6-4', the UE2 cross-checks, in point 6-7, the indicated supported media types with user equipment capabilities. In the example, UE2 does not support media type c, so the UE2 shows, in point 6-8, the group advertisement/invitation to join group communication to the user with an indication that the supported media type by the group in question is b.

When the server 2 receives message 6-9, it retrieves, in point 6-5', group member capabilities of UE3, which in this example is a. The server 2 then cross-checks, in step 6-6', the indicated supported media types b, and c with the group member capability a. In this example, since there is no match, the server 2 does not send anything to UE3.

In some other embodiment of the invention, the server 2 may be configured to cross-check the indicated media types with user equipment capabilities. In the embodiment, message 6-4' of the above example would have contained only b as the indicated supported media type.

The steps, signaling messages and related functions described above in FIGS. 2 to 6 are in no absolute chronological order, and some of the steps may be performed simultaneously or in an order differing from the given one. Other functions can also be executed between the steps/signaling messages or within the steps. Some of the steps or part of the steps can also be omitted. The signaling messages are only exemplary and may even comprise several separate messages for transmitting the same information. In addition, the messages may also contain other information.

The user equipment, and/or servers or corresponding server components and/or other corresponding devices implementing the functionality of the present invention comprise not only prior art means but also means for cross-checking information on supported media types indicated by a message targeted to group members with usable media types in the manner described above. Present servers and user equipment comprise processors and memory that can be utilized in the functions according to the invention. All modifications and configurations required for implementing the invention may be performed as routines, which may be implemented as added or updated software routines, application specific integrated circuits (ASIC) and/or programmable circuits. Software routines, also called program products, including applets and macros, can be stored in any computer-readable data storage medium and they include program instructions to perform particular tasks. Software routines may be downloaded into a device. For example, a group communication server may comprise a cross-checking unit configured, in response to a message indicating one or more supported media types by a group, to cross-check the indicated supported media types with usable media types; and a sending unit configured to send the message without modifying the indicated supported media types, if all indicated supported media types are usable media types. Another example is a group communication server comprising cross-checking means for crosschecking, in response to a message indicating one or more supported media types by a group, the indicated supported media types with usable media types; and sending means for sending the message without modifying the indicated supported media types, if all indicated supported media types are usable media types.

It will be obvious to a person skilled in the art that, as technology advances, the inventive concept can be implemented in various ways. The invention and its embodiments are not limited to the examples described above but may vary within the scope of the claims

The invention claimed is:

1. An apparatus comprising:
at least one memory including computer program code; and
at least one processor; and
wherein the at least one memory and the computer program code are configured to, with the at least one processor, cause the apparatus at least to:
receive a message containing no media content, the message indicating one or more supported media types by a group;
cross-check the indicated supported media types with usable media types in the group;
based on the cross-check, determine whether at least one of the indicated supported media types is found in the usable media types in the group; and
based on the determination, send the message without modifying the indicated supported media types if all of the indicated supported media types are determined to be usable media types.

2. The apparatus of claim 1, wherein the usable media types comprise at least one group of: defined supported media types by the group, allowable media types of a group member, group member capabilities of a group member, and user equipment capabilities of user equipment used by a group member.

3. The apparatus of claim 1, wherein the at least one memory and the computer program code are further configured to, with the at least one processor, cause the apparatus at least to:
cross-check the indicated supported media types with defined supported media types; and
modify the message to include a defined supported media type missing from the message as the indicated supported media type.

4. The apparatus of claim 1, wherein the at least one memory and the computer program code are further configured to, with the at least one processor, cause the apparatus at least to:
cross-check the indicated supported media types with defined supported media types; and
remove from the message an indicated supported media type that is not included in the defined supported media type for the group.

5. The apparatus of claim 1, wherein the at least one memory and the computer program code are further configured to, with the at least one processor, cause the apparatus at least to:
cross-check the indicated supported media types with allowable media types of a group member; and
remove from the message an indicated supported media type that is not included in the allowable media types of the group member.

6. The apparatus of claim 5, wherein the at least one memory and the computer program code are further configured to, with the at least one processor, cause the apparatus at least to send the message as a customized message to the group member.

7. The apparatus of claim 1, wherein the at least one memory and the computer program code are further configured to, with the at least one processor, cause the apparatus at least to:
cross-check the indicated supported media types with group member capabilities of a group member; and
remove from the message an indicated supported media type that is not supported by the group member capabilities.

8. The apparatus of claim 1, wherein the at least one memory and the computer program code are further configured to, with the at least one processor, cause the apparatus at least to:
cross-check the indicated supported media types with user equipment capabilities of user equipment used by a group member; and
remove from the message an indicated supported media type that is not supported by the user equipment capabilities.

9. An apparatus, comprising:
at least one memory including computer program code; and
at least one processor; and
wherein the at least one memory and the computer program code are configured to, with the at least one processor, cause the apparatus at least to:
receive a message, the message including at least one of an advertisement of a group and an invitation to group members to join a group, the message containing no indication of one or more supported media types by the group; and based on the message, add an indication of group-specific supported media types to the message.

10. An apparatus comprising:

at least one memory including computer program code; and at least one processor; and wherein the at least one memory and the computer program code are configured to, with the at least one processor, cause the apparatus at least to:

receive a message containing no media content, the message indicating one or more supported media types by a group;

compare the indicated one or more supported media types with capabilities of the apparatus;

based on the comparison, determine whether the indicated one or more supported media types are supported by the capabilities of the apparatus; and show the message to a user if all of the indicated one or more supported media types are supported by the capabilities of the apparatus.

11. The apparatus of claim 10, wherein the at least one memory and the computer program code are further configured to, with the at least one processor, cause the apparatus at least to remove from the message an indicated supported media type that is not supported by the capabilities.

12. A method comprising:

receiving, by an apparatus supporting group communication, a message containing no media content, the message indicating one or more supported media types by a group;

comparing, in response to the message, the indicated one or more supported media types to one or more media types defined to be usable by the group;

based on the comparison, determining whether the indicated one or more supported media types can be found in the defined usable media types; and determining how to continue based on the comparison.

13. The method of claim 12, wherein the method further comprises adding, with the apparatus, to the message a defined supported media type not included in the message as an indicated supported media type; and wherein the comparison comprises comparing the indicated supported media types with defined supported media types.

14. The method of claim 12, further comprising removing from the message an indicated supported media types with defined supported media types; and wherein the comparison comprises comparing the indicated supported media types to defined supported media types.

15. The method of claim 12, further comprising:

removing from the message an indicated supported media type that is not included in the allowable media types of a group member; and wherein the comparison comprises comparing the indicated supported media types to allowable media types of a group member.

16. The method of claim 12, further comprising:

removing from the message an indicated supported media type that is not supported by group member capabilities; and wherein the comparison comprises comparing the indicated supported media types to capabilities of a group member.

17. The method of claim 12, further comprising:

removing from the message an indicated supported media type that is not supported by user equipment capabilities; and wherein the comparison comprises comparing the indicated supported media types to capabilities of user equipment used by a group member.

18. The method of claim 12, further comprising sending the message to one or more group members and/or showing the message to a user if the message contains at least one indicated supported media type by the group.

19. The method of claim 12, further comprising ignoring the message if the message does not contain an indicated supported media type after cross-checking.

20. A computer program product embodied in a device-readable non-transitory medium and comprising program instructions, wherein execution of the program instructions causes a device containing the computer program product to perform a process, the process comprising:

receiving a message containing no media content and indicating at least one supported media type by a group;

comparing, in response to receiving the message, the indicated at least one supported media type with media types defined to be usable by the group;

determining, based on the comparison, whether the indicated at least one supported media type is found in the defined usable media types; and deciding how to continue based on the comparison.

* * * * *